US010750909B2

(12) United States Patent
Cotter

(10) Patent No.: US 10,750,909 B2
(45) Date of Patent: Aug. 25, 2020

(54) GRATER

(71) Applicant: Progressive International Corporation, Kent, WA (US)

(72) Inventor: Jennifer K. Cotter, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 221 days.

(21) Appl. No.: 15/923,401

(22) Filed: Mar. 16, 2018

(65) Prior Publication Data

US 2018/0263423 A1 Sep. 20, 2018

Related U.S. Application Data

(60) Provisional application No. 62/472,439, filed on Mar. 16, 2017.

(51) Int. Cl.
*A47J 43/25* (2006.01)
(52) U.S. Cl.
CPC ..................... *A47J 43/25* (2013.01)
(58) Field of Classification Search
CPC ............... A47J 43/25; B02C 19/20
USPC .................................. 241/95, 273.1
See application file for complete search history.

(56) References Cited

U.S. PATENT DOCUMENTS

| | | | | |
|---|---|---|---|---|
| 1,160,043 | A * | 11/1915 | Clark | A47J 43/25 241/273.1 |
| 1,633,700 | A * | 6/1927 | Hawkins | A47J 43/25 241/95 |
| 2,720,234 | A * | 10/1955 | Fett | A47J 43/25 241/273.1 |
| 6,135,375 | A * | 10/2000 | Kaposi | A47J 43/25 241/273.1 |
| 2005/0006505 | A1 * | 1/2005 | McNeeley | A47J 43/25 241/95 |
| 2012/0085850 | A1 * | 4/2012 | Tetreault | A47J 43/25 241/101.2 |
| 2014/0246527 | A1 * | 9/2014 | Lee | A47J 43/25 241/95 |
| 2016/0157679 | A1 * | 6/2016 | Benoit | A47J 43/25 241/95 |
| 2016/0302620 | A1 * | 10/2016 | Repac | B26D 3/185 |

FOREIGN PATENT DOCUMENTS

| | | | | |
|---|---|---|---|---|
| DE | | 605399 C * | 11/1934 | A47J 43/25 |
| WO | WO-2005037039 A2 * | | 4/2005 | A47J 43/25 |

* cited by examiner

*Primary Examiner* — Adam J Eiseman
*Assistant Examiner* — Dylan Schommer
(74) *Attorney, Agent, or Firm* — Lowe Graham Jones, PLLC

(57) ABSTRACT

A grater includes a grater body having a first grater surface forming a first grater body sidewall, and a second grater surface forming a second grater body sidewall, each of the first and second grater surfaces having one or more grating features. A removable grating plane is selectively attachable to the grater body. An optional cover may surround the grater body.

11 Claims, 5 Drawing Sheets

GRATER

PRIORITY CLAIM

This application claims the benefit of U.S. provisional application No. 62/472,439 filed Mar. 16, 2017, the contents of which are incorporated by reference.

FIELD OF THE INVENTION

The present invention relates to food graters.

BACKGROUND OF THE INVENTION

Food graters are commonly used, and often come in two main forms, including an upright or box grater and a planar grater. The box grater is useful in many situations, and typically includes a convenient handle atop a box-shaped grater having one or more grating surfaces. The planar grater is more difficult to hold in an upright position, but is more convenient for spanning the top of a bowl to allow grating directly into a bowl. These different functions and advantages lead man consumers to purchase multiple graters, or to use one or the other graters in situations that are less convenient than they could be.

SUMMARY OF THE INVENTION

A preferred grater includes a grater body having a first grater surface forming a first grater body sidewall, and a second grater surface forming a second grater body sidewall, each of the first and second grater surfaces having one or more grating features, the grater body extending upward from a base at a lower end of the grater body, the base being configured to support the grater body, the grater body having a handle mounted at an upper end, the grater body sidewall defining an open space between the first grater body sidewall and the second grater body sidewall.

A removable grating plane is removably attached to the grater body, the removable grating plane being positioned within the open space between the first grater body sidewall and the second grater body sidewall and extending upwardly from the base toward the handle to form a third grater body sidewall when the removable grating plane is attached to the grater body.

In one version, the base further comprises a lateral flange extending outwardly from the base, the removable grating plane engaging the flange to retain the removable grating plane on the base.

Preferably, an upper channel is formed on the grater body, the removable grating plane engaging the upper channel to retain the removable grating plane on the grater body.

The removable grating plane may have a foot, the foot being configured to engage the flange to retain the removable grating plane on the base. Likewise, the removable grating plane may have an upper grating attachment, the upper grating attachment being configured to engage the upper channel to retain the removable grating plane on the grater body.

In some versions, a cover is removably attachable to the grater body, the cover being configured to cover the first grating surface and the second grating surface when the cover is attached to the grater body. The cover may further include an inwardly-curved upper shoulder and at least one inwardly-curved upper lateral side shoulder which extends around a terminal end of the grater to grip an upper lateral edge of the grater body. The cover may also include a tab extending laterally outward, whereby a user may grasp the tab to pry the cover from the grater body.

The grater body may terminate in an upper cap joining the first grater body sidewall to the second grater body sidewall, in which the handle is mounted on a handle base, the handle base being attached to the upper cap.

The upper cap preferably comprises a recess positioned adjacent an upper end of the removable grating plane when the removable grating plane is attached to the grater body.

Preferably, the grater body and the removable grating plane combine to form a pyramidal grater when the removable grating plane is attached to the grater body. Most preferably, the base forms a triangular footprint.

In preferred versions, the first grater surface is permanently attached to the second grater surface.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
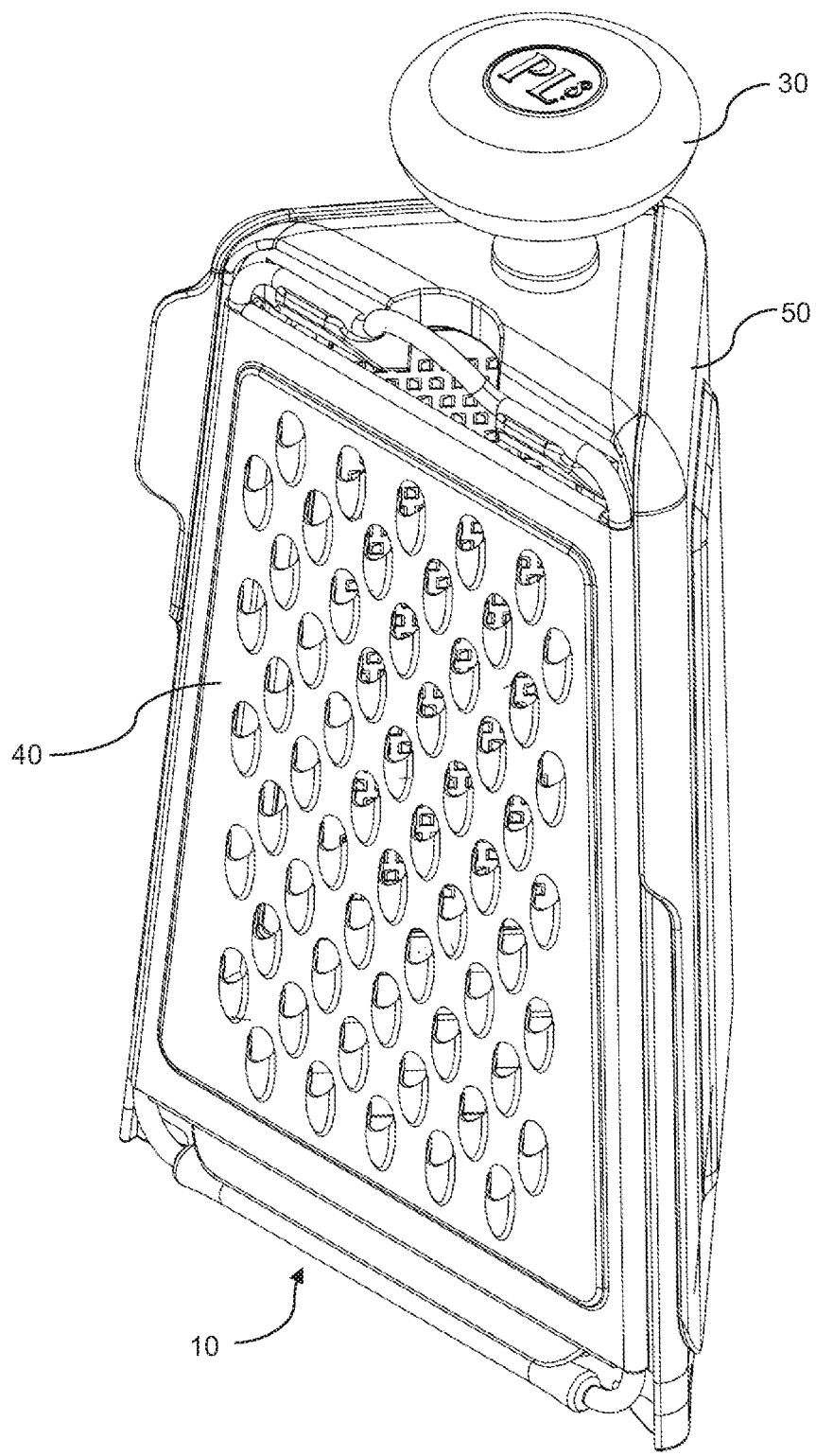
FIG. 1 is a top perspective view of a preferred grater.
Figure 2:
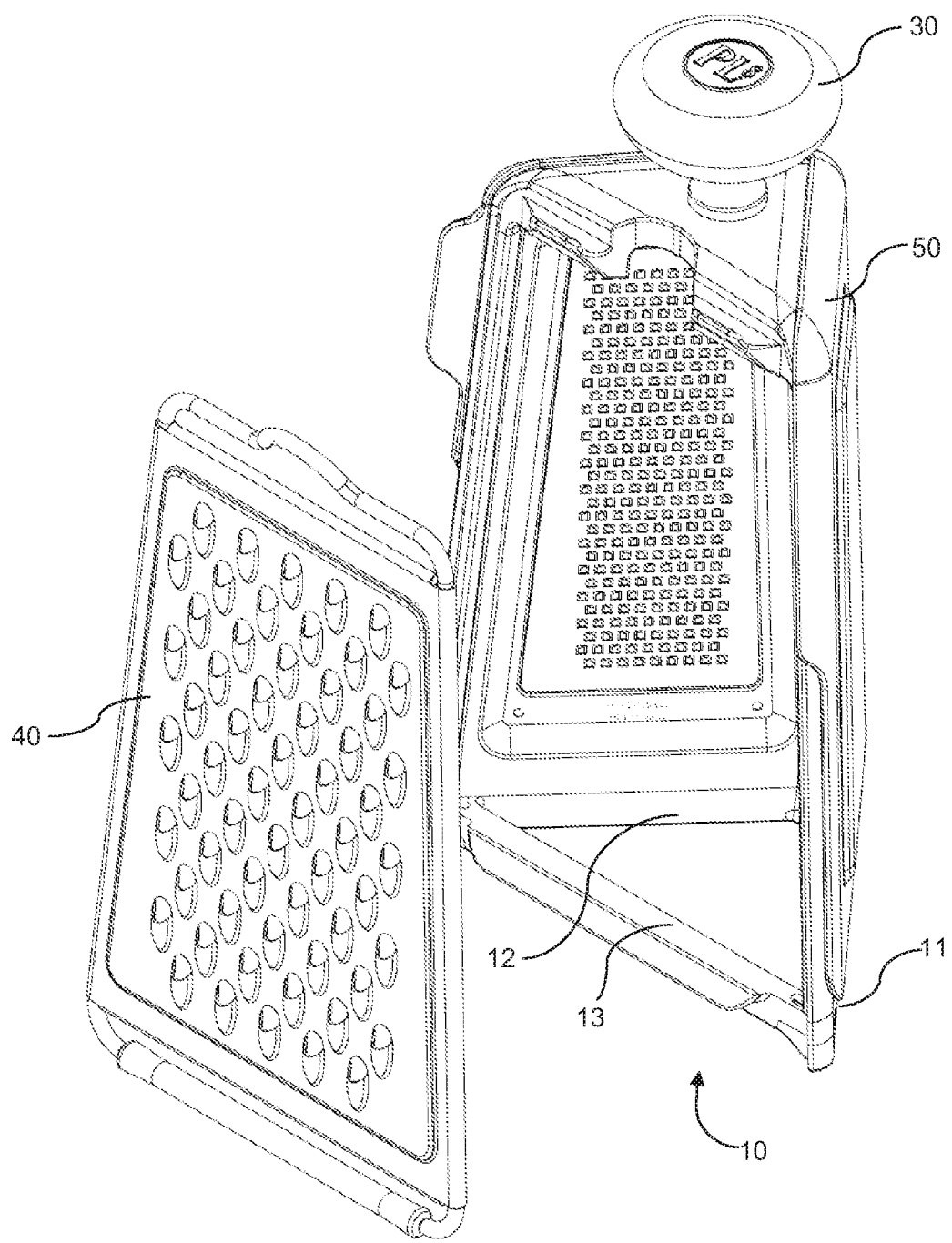
FIG. 2 is a top perspective view of a preferred grater, shown with a removable grating plane detached and with a cover attached to the remaining two grating surfaces.
Figure 3:
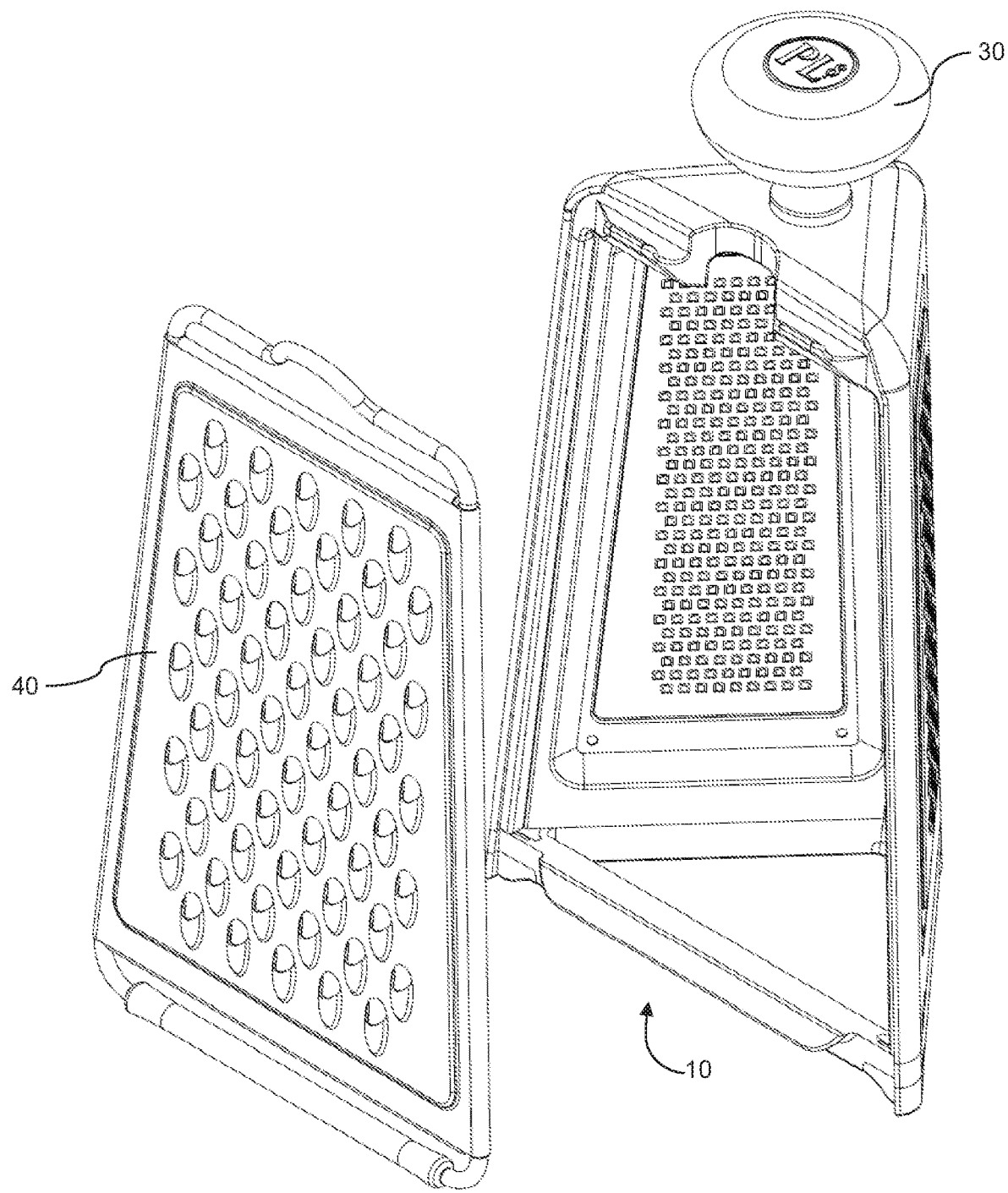
FIG. 3 is a top perspective view of a preferred grater, shown with a removable grating plane detached and with the cover removed from the remaining two grating surfaces.
Figure 4:
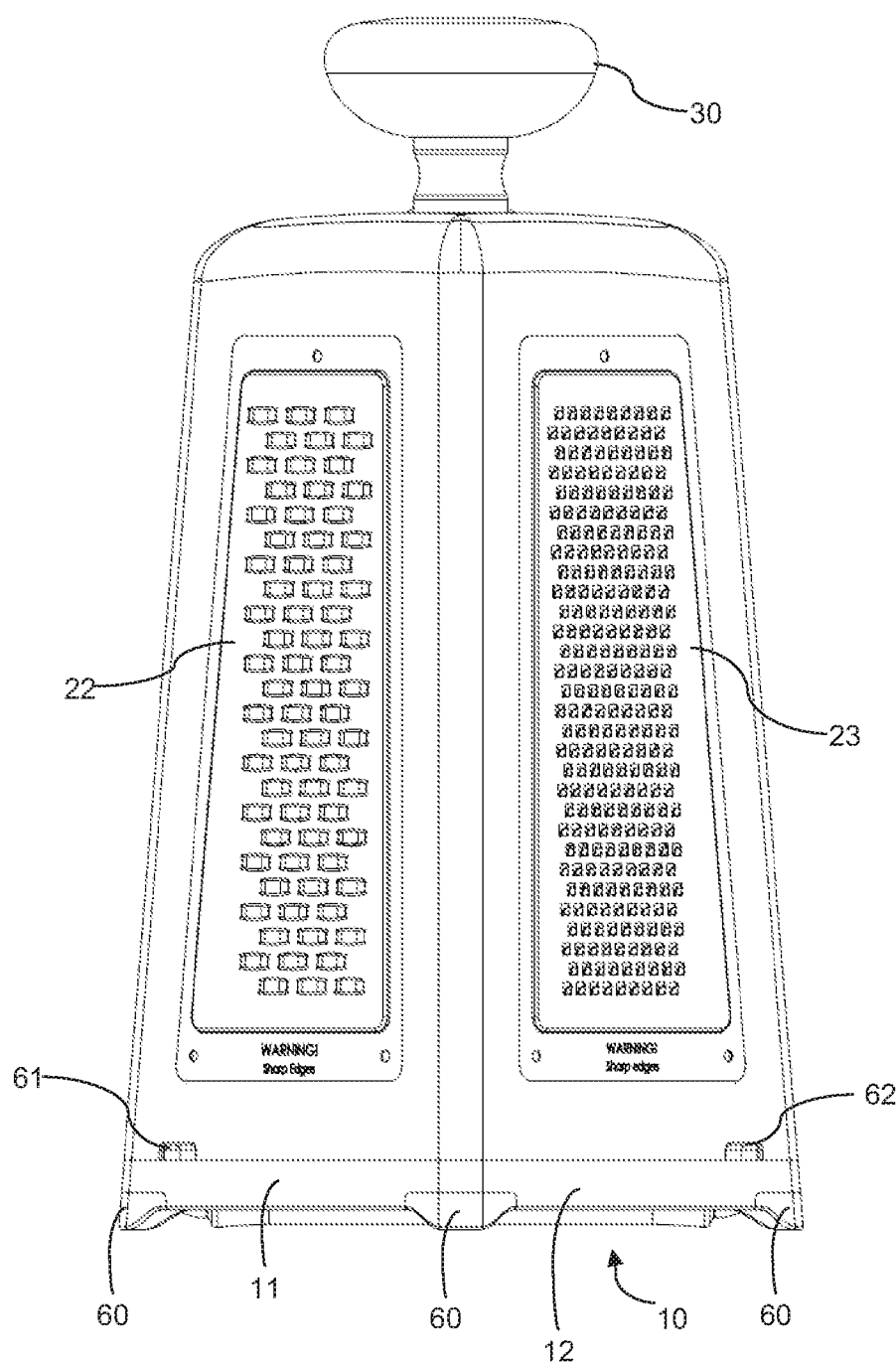
FIG. 4 is a rear elevational view of the preferred grater.
Figure 5:
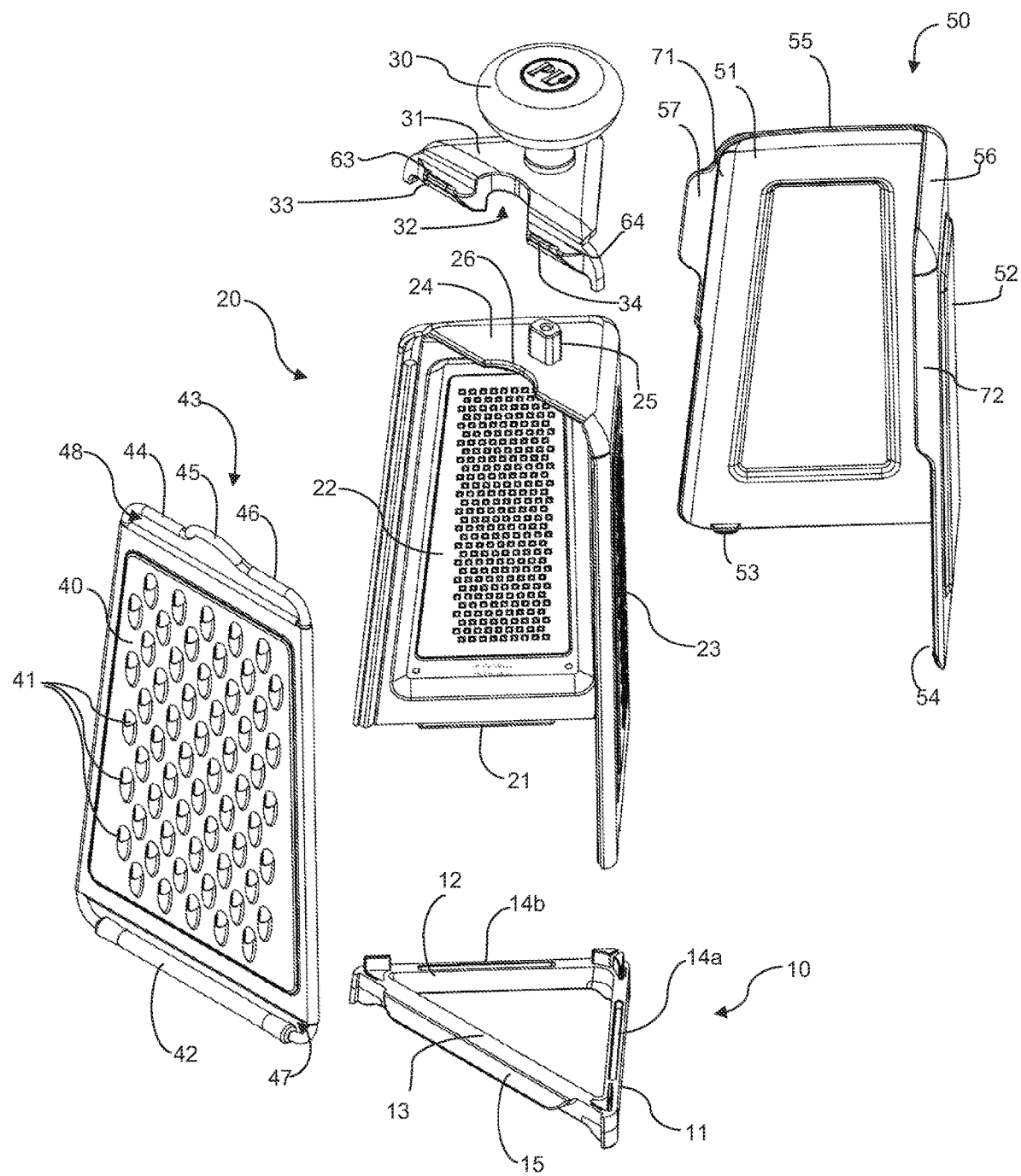
FIG. 5 is a top exploded perspective view of the preferred grater.

FIG. 1 illustrates a preferred grater which includes several sides having grating surfaces (in the illustrated example, the grater has three sides), supported by a base 10 at the bottom and terminating in a handle 30 at the top. Most preferably, the handle is formed as a knob-shaped grip. In a preferred version, at least one of the grating surfaces is removable grating plane 40. In another version, a removable cover 50 encloses one or more grating surfaces, and most preferably it covers the two (or more) permanently affixed grating surfaces while leaving the removable grating surface uncovered.

The base 10 is configured with three cross members 11, 12, 13 extending between three corners, thereby allowing for attachment and support for three generally planar grating surfaces. In the illustrated example, two of the cross members 11, 12 include slots 14a, 14b, formed along an upper surface, for receiving downwardly-extending ribs, e.g. 21, formed in a main grater body 20. The base is preferably formed to support the grater on a horizontal surface such as a countertop, and may terminate in one or more feet 60 formed from a resilient, non-skid material. While the illustrated version includes three sides and three grating surfaces, other versions may have a different number of sides.

The main grater body, in accordance with the illustrated example, includes a first grater surface 22 forming a first main body sidewall, and a second grater surface 23 forming a second main body sidewall, each of the sidewalls preferably being planar in shape. Most preferably, the first and second grater surfaces are formed with different arrays of sharpened edges to allow different grating configurations. Each of the first and second grater surfaces are configured to extend upwardly from the base, specifically from cross members 11, 12. The main body terminates in a cap 24 at an upper end, in which the cap preferably is formed as a horizontal section joining the first and second grater surfaces. The end cap further includes a vertical mount 25 for attachment to a handle 30. In the illustrated example, the sidewalls are trapezoidal in perimeter, having a wider base and a narrower top so that the overall grater forms a truncated pyramid shape.

The end cap preferably includes a recess 26, to allow a user to pry a finger into the recess for removal of a third grating surface 40. The handle 30, in the illustrated example, is attached to a handle base 31 which attaches to the handle mount and covers the end cap. As shown, the handle base likewise includes a recess 32, in the position of the end cap recess when the handle base is attached to the end cap.

The third grating surface 40 is removably attachable to the main grater body, so that when it is attached it encloses the open vertical space between the ends of the first and second grater sidewalls, and when it is removed the first and second grater sidewall leave an open space above the third cross member.

In a preferred example, the base includes a flange 15, extending laterally outward and downward from the third cross member 13. As illustrated, the flange preferably extends substantially along the entire length of the cross member. At an upper end of the grater, preferably formed in the handle base or in the end cap, a pair of upper mounts 33, 34 are formed. In the illustrated example, the upper mounts are configured as outwardly and upwardly extending flanges, forming a concave recess 63, 64 which is open at the top.

The third grater surface 40, or removable grater surface, includes an array of grater features 41, such as sharpened teeth and adjacent openings for grating. A lower end of the third grater surface includes a foot 42, which may be in the form of a cylindrical bar extending horizontally across the third grater surface. In one example, the third grater surface is bounded by a rigid wire which, at the lower end of the third grater surface, supports a barrel serving as the cylindrical bar. As illustrated a gap or opening 47 is provided between the foot and the lower end of the third grater surface. The bar or barrel may optionally be formed from a resilient material to provide a non-skid surface for the third grater surface. The foot further serves as a lower grater attachment to enable attachment of the third grater surface to the main grater body.

At the upper end of the third grater surface, an upper grater attachment 43 is provided. In the illustrated version, the upper grater attachment is formed as a rigid wire extending from a first side to a second side of the third grater surface. The wire includes a first horizontal portion 44, a central bent portion 45, and a third horizontal portion 46. Preferably, an upper gap or opening 48 is provided between the upper edge of the third grater surface and the upper grater attachment.

To attach the third grater surface to the main body, the lower flange 15 is inserted into the lower opening 47 so that it engages the foot 42 of the third grater surface. The third grater surface is then rotated so that the upper mounts 33, 34 pass through the upper opening 48 and engage the horizontal wire portions 44, 46 of the upper grater attachment. Preferably, the distances between the foot 42 and the upper grater attachment 43, and also that between the lower flange 15 and the upper mounts 33, 34, are such that the third grater surface will snap-fit into the main grater body and be snugly received and held in place.

Removal of the third grater surface is accomplished by inserting a finger into the recess 32 at the top of the grater, allowing the user to pry the upper end of the third grater surface away by pushing against the curved portion 45 of the upper grater attachment.

It should be appreciated that the third grater surface can be formed to be removably attached in a different manner, such as by incorporating locking and complementary surfaces along the sides of the main grater body, or by using other tab and slot, tongue and groove, or yet other locking features. Likewise, the upper grater attachment need not have the same horizontal and curved sections, but rather an upper rigid wire may be used in the same fashion but while configured with a different shape. Similarly, the foot of the third grater surface may be configured differently while still serving as an attachment location.

In one version, the main grater body further includes a cover 50 configured to enclose the first and second grater surfaces when attached to the main body. Thus, the cover includes a first side 51 and a second side 52, each of the first and second sides having a surface area approximately the same as, or slightly larger than, that of the first and second grater sidewalls.

The cover is removably attachable to the main grater body, and is preferably configured to snap-fit to the main grater body. In the illustrated example, the cover includes one or more lower tabs 53, 54 extending toward an interior space formed by the cover. Mating slots 61, 62 are formed in the lower ends of the first and second grater surfaces, or alternatively in the base. In other versions different interlocking surfaces are used, and for example the orientation of the tabs and slots may be reversed.

The upper end of the cover includes an inwardly-curved upper shoulder 55, 56 formed along the upper edge of both of the first side and the second side. The shoulders engage an upper outer edge of the handle base when the cover is attached to the grater body. A pair of lateral side shoulders 71, 72 extend around the terminal ends of the grater to grip the upper lateral edges of the first and second grater surfaces. Together, the upper shoulders and upper lateral side shoulders cooperate with the lower tabs to retain the cover against the main body and to cover the first and second grating surfaces. The cover preferably also includes at least one flange 57, which in the illustrated example is positioned at an upper end of the cover, on the first sidewall 51. The flange extends beyond the perimeter of the side of the cover, and allows a user to apply an outward force to the flange to enable separation of the tabs from the slots, and thereby removal of the cover from the main body.

In use, the grater may be used as an upright pyramidal grater. As one example, the third removable grating surface may be attached to the base and grater body and the cover attached to the first and second grating surfaces. A user may then scrape a food item across the third grating surface to cause grating of the food item. The cover protects a user against cuts that may occur by inadvertent contact with the first and second surfaces.

The cover may also be removed, to allow a user to operate the grater by using the first and second grating surfaces.

Optionally, the user may remove the third grating surface to allow the third grating surface to be used separately from the main body. A user may thus rest the resilient foot on a countertop, cutting board or a plate, and grasp the upper grater attachment as a handle to then allow for grating. The planar third grating surface may alternatively be placed atop the rim of a bowl, again grasping the handle or other part of the third grating surface, to allow for grating directly into the bowl.

For storage, the third grating surface is reattached to the main grater body and the cover is attached, to protect against injury or damage when stored.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims.

I claim:

1. A grater, comprising:
a grater body having a first grater surface forming a first grater body sidewall, and a second grater surface forming a second grater body sidewall, each of the first and second grater surfaces having one or more grating features, the grater body extending upward from a base at a lower end of the grater body, the base being configured to support the grater body, the grater body having a handle mounted at an upper end, the grater body defining an open space between the first grater body sidewall and the second grater body sidewall;
a removable grating plane removably attached to the grater body, the removable grating plane being positioned within the open space between the first grater body sidewall and the second grater body sidewall and extending upwardly from the base toward the handle to form a third grater body sidewall when the removable grating plane is attached to the grater body;
an upper cap joining the first grater body sidewall to the second grater body sidewall; and
a rigid wire bounding the removable grating plane, the rigid wire forming a foot at a lower end of the removable grating plane and forming an upper grater attachment at an upper end of the removable grating plane, the foot being removably attached to the base and the upper grater attachment being removably attached to the upper cap, whereby the removable grating plane is removably attached to the grater body by the rigid wire.

2. The grater of claim 1, wherein the base further comprises a lateral flange extending outwardly from the base, the foot removably engaging the flange to retain the removable grating plane on the base.

3. The grater of claim 2, further comprising an upper channel formed on the upper cap, the upper grater attachment removably engaging the upper channel to retain the removable grating plane on the grater body.

4. The grater of claim 1, further comprising a cover removably attachable to the grater body, the cover being configured to cover only the first grating surface and the second grating surface when the cover is attached to the grater body.

5. The grater of claim 4, wherein the cover further includes an inwardly-curved upper shoulder.

6. The grater of claim 4, wherein the cover further includes at least one inwardly-curved upper lateral side shoulders which extends around a terminal end of the grater to grip an upper lateral edge of the grater body.

7. The grater of claim 6, wherein the cover further includes a tab extending laterally outward, whereby a user may grasp the tab to pry the cover from the grater body.

8. The grater of claim 1, wherein the upper cap joins the first grater body sidewall to the second grater body sidewall, and further wherein the handle is mounted on a handle base, the handle base being attached to the upper cap.

9. The grater of claim 2, wherein the grater body and the removable grating plane combine to form a pyramidal grater when the removable grating plane is attached to the grater body.

10. The grater of claim 9, wherein the base forms a triangular footprint.

11. The grater of claim 10, wherein the first grater surface is permanently attached to the second grater surface.

* * * * *